United States Patent [19]

Buschur et al.

[11] Patent Number: 4,610,046
[45] Date of Patent: Sep. 9, 1986

[54] VARIABLE THROW CRANK ARM ASSEMBLY FOR WINDSHIELD WIPER DRIVE

[75] Inventors: Jeffrey J. Buschur, Beavercreek; Ernest G. Franklin, Kettering; William S. Shufflebarger, Beavercreek, all of Ohio

[73] Assignee: General Motors Corporation, Detroit, Mich.

[21] Appl. No.: 691,921

[22] Filed: Jan. 16, 1985

[51] Int. Cl.⁴ .............................................. B60S 1/26
[52] U.S. Cl. .................... 15/250.16; 74/70; 74/75
[58] Field of Search ........................ 15/250.16, 250.17; 74/70, 75, 600

[56] References Cited

U.S. PATENT DOCUMENTS

| | | | |
|---|---|---|---|
| 2,587,163 | 2/1952 | Jackson | 74/70 |
| 2,717,518 | 9/1955 | Latta . | |
| 3,665,772 | 5/1972 | Beard et al. . | |
| 3,693,209 | 9/1972 | Winkelmann et al. . | |
| 3,942,385 | 3/1976 | Westerdale . | |
| 4,028,950 | 6/1977 | Osterday . | |
| 4,400,844 | 8/1983 | Hayakawa et al. . | |
| 4,454,626 | 6/1984 | Schmidt et al. | 15/250.16 |

FOREIGN PATENT DOCUMENTS 873802 4/1953 Fed. Rep. of Germany .......... 74/70

Primary Examiner—Peter Feldman
Attorney, Agent, or Firm—Saul Schwartz

[57] ABSTRACT

In a windshield wiper drive system of the type having a reciprocating drive link and a reversible electric motor, a variable throw crank arm assembly between the drive link and the motor drive shaft including a first arm rigidly attached to the drive shaft, a second arm pivotally attached to the first arm and to an end of the drive link, a guide follower on the second arm, and a guide channel on the motor housing receiving the guide follower. The guide channel has a circular portion centered on the drive shaft axis and a noncircular escape portion radially outboard of the circular portion and merging therewith at a junction. When the drive shaft rotates continuously in one direction, the guide follower traverses the circular portion and holds the second arm in a short-throw folded position relative to the first arm. When the drive shaft rotates in the opposite direction, the guide follower automatically enters the escape portion and concurrently pivots the second arm to a long-throw unfolded position relative to the first arm.

2 Claims, 4 Drawing Figures

4,610,046

VARIABLE THROW CRANK ARM ASSEMBLY FOR WINDSHIELD WIPER DRIVE

BACKGROUND OF THE INVENTION

1. Field of the Invention

This invention relates generally to windshield wiper drive systems and, more particularly, to that portion of such systems whereby wiper arms are parked below normal wipe patterns.

2. Description of Prior Art

In typical automotive windshield wiper systems of the type having a reciprocating drive link between a wiper arm and a motor driven crank arm, the wiper arm traverses a wipe pattern between fixed inner and outer limits as the crank arm rotates continuously in one direction. According to numerous prior proposals, the wiper arm may be pivoted through an extended arc to a parked position below the wipe pattern by increasing the length or throw of the crank arm during the final stroke of the wiper arm. In some prior proposals, the crank arm throw is increased by an eccentric member disposed between the crank arm and the drive link, the eccentric member being latched or otherwise held in one position for normal wipe operation and then released for pivotal movement to a position increasing the crank arm throw for parking the wiper arm. Proposals for latching and releasing the eccentric member have included detent arrangements on the crank arms sensitive to the direction of rotation of the crank arms whereby the eccentric member is unlatched when the direction of rotation of the crank arm reverses. In another proposal, the crank arm is supported for rotation in a slide member which is held by reaction forces in one operative position during normal wipe movement and then slides under the influence of opposite reaction forces to a second operative position more remote from the wiper arm when the direction of rotation of the crank arm is reversed. A variable throw crank arm assembly according to this invention has a fixed guide on the vehicle body engaging a guide follower rotatable with the crank arm whereby the throw of the crank arm is increased upon motor reversal and represents a novel alternative to heretofore known arrangements for effecting pivotal movement of wiper arms to parked positions.

SUMMARY OF THE INVENTION

Accordingly, the primary feature of this invention is that it provides a new and improved variable throw crank arm assembly between a reversible electric motor drive shaft and a reciprocating drive link connected to a windshield wiper arm. Another feature of this invention resides in the provision in the new and improved crank arm assembly of a first arm rigidly attached to the motor drive shaft, a second arm pivotally attached to the first arm and to a distal end of the drive link, and a fixed guide on the motor housing engaged by a guide follower on the second arm, the guide and guide follower cooperating to maintain the second arm in a folded, short-throw position relative to the first arm during continuous rotation of the drive shaft in one direction and to pivot the second arm to an unfolded, long-throw position relative to the first arm in response to rotation of the drive shaft in the opposite direction. Yet another feature of this invention resides in the provision in the new and improved crank arm assembly of a fixed guide on the motor housing in the form of a channel having a circular portion centered on the axis of rotation of the drive shaft and an escape portion radially outboard of the circular portion and merging therewith at an open junction, the guide follower traversing the circular portion during continuous rotation of the drive shaft in the first direction and being retained therein at the junction by reaction forces and escaping through the junction into the escape portion upon rotation of the drive shaft in the opposite direction.

These and other features of this invention will be readily apparent from the following specification and from the drawings wherein.

Figure 1:
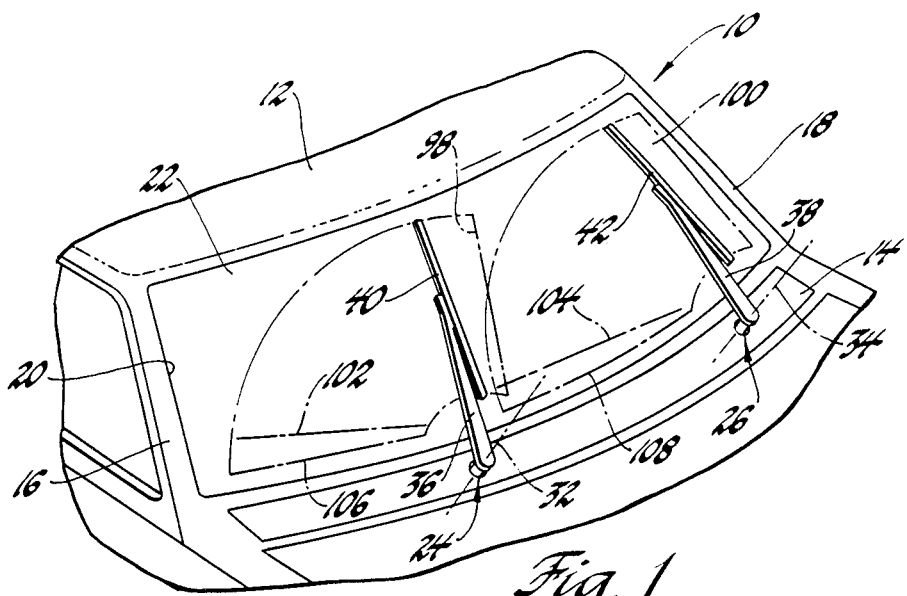
FIG. 1 is an outer perspective view of the front windshield portion of an automobile type vehicle body having a windshield wiper drive including a variable throw crank arm assembly according to this invention.

Referring now to FIG. 1 of the drawings, a partially illustrated automobile type of vehicle body 10 includes a roof 12, a cowl 14 and a pair of front pillars 16 and 18 extending therebetween on opposite sides of the body. The roof, cowl and front pillars cooperate in defining a windshield opening 20 in which is disposed a glass windshield panel 22. A pair of windshield wiper transmissions 24 and 26 are disposed below the windshield 22 under the cowl 14 and support, respectively, a pair of transmission shafts 28 and 30 for rotation on a corresponding pair of axes 32 and 34 of the vehicle body, FIG. 2. A pair of windshield wiper arms 36 and 38 are rigidly attached to the outboard ends of the transmission shafts 28 and 30, respectively, for rotation as a unit therewith and support a pair of wiper blades 40 and 42 for movement across the windshield panel 22.

Figure 2:
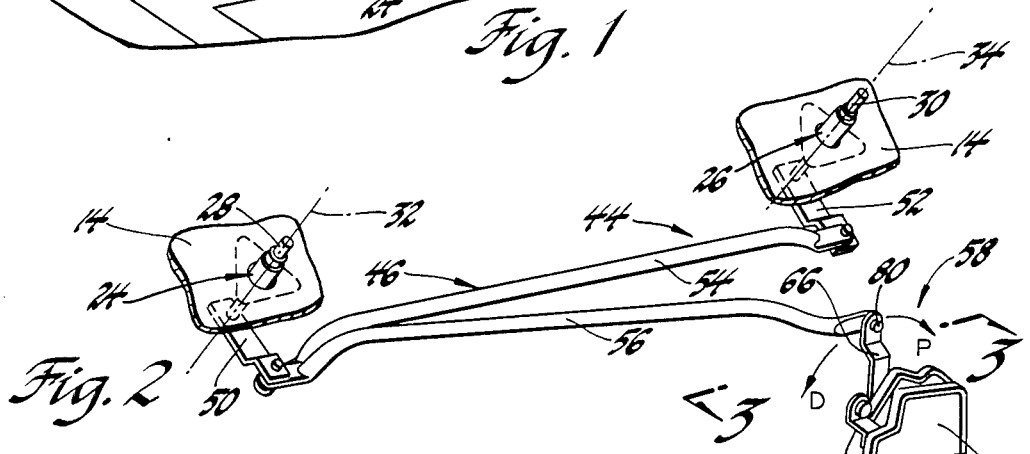
FIG. 2 is a perspective view of a windshield wiper drive system incorporating a variable throw crank arm assembly according to this invention.

Referring to FIGS. 1 and 2, a drive system 44 for the wiper arms 36 and 38 is disposed under the cowl 14 and includes a reversible electric motor 45 and a linkage system 46. The motor 45 includes a housing 47 rigidly attached to the vehicle body 10 and a drive shaft 48 supported on the housing for rotation in opposite directions about an axis 49 of the vehicle body. The linkage system 46 includes a pair of transmission crank arms 50 and 52 rigidly attached to corresponding ones of the transmission shafts 28 and 30 for rotation as a unit therewith about the axes 32 and 34. The linkage system further includes a cross link 54 pivotally attached at opposite ends to the transmission crank arms 50 and 52 and a drive link 56 pivotally attached at one end to the transmission crank arm 50 at the pivotal connection between the latter and the cross link 54. Reciprocation of the drive link 56 generally transversely of the vehicle body effects simultaneous or synchronized pivotal movement of the transmission shafts 28 and 30 and attached wiper arm 36 and 38 about the axes 32 and 34 through included angles proportional to the amplitude of the stroke of the drive link. A variable throw crank arm assembly 58 according to this invention is disposed between the drive link 56 and the motor 45 and functions to convert the rotary output of the latter into reciprocation of the drive link through selectively variable amplitudes.

Figure 3:
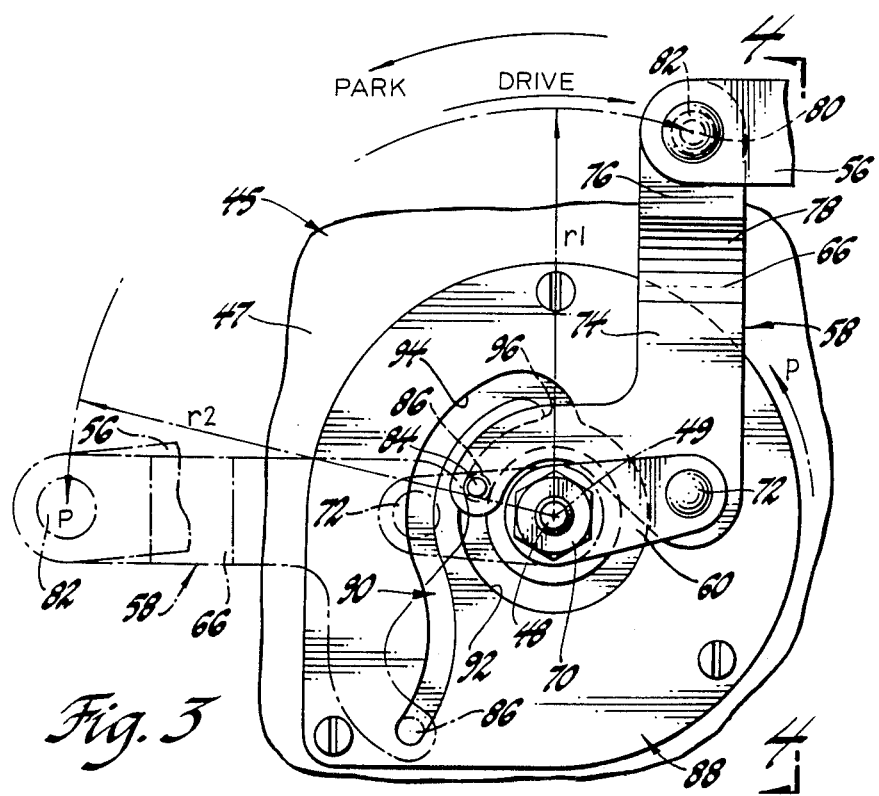
FIG. 3 is an enlarged view taken generally along the plane indicated by lines 3—3 in FIG. 2.
Figure 4:
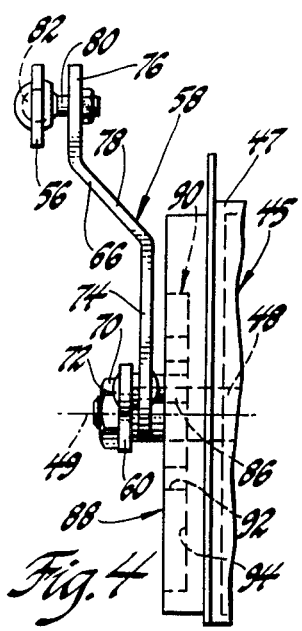
FIG. 4 is a view taken generally along the plane indicated by lines 4—4 in FIG. 3.

As seen best in FIGS. 3 and 4, the variable throw crank arm assembly 58 includes a relatively short first arm 60 and a generally L-shaped second arm 66. The first arm 60 is rigidly attached to the drive shaft 48 for rotation as a unit with the latter about the axis 49 and is retained thereon by a nut 70 on the end of the drive shaft. A pin 72 supported on the first arm 60 orbits in a circle around the axis 49 when the drive shaft 48 rotates and is closely received in an appropriate aperture in the second arm 66 whereby the pin defines a pivot joint between the first arm and the second arm, the pin being headed over above the first arm and below the second arm for retention purposes. The second arm 66 includes an inner planar portion 74 juxtaposed the lower surface of the first arm 60, an outer planar portion 76 parallel to the inner planar portion, and an integral connecting portion 78 between the inner and outer planar portions. A pin 80 is rigidly connected to the second arm 66 at the outer planar portion 76 and includes a spherical end 82 on the side of the outer planar portion away from motor 45. The spherical end 82 is received in an appropriate socket at the end of the drive link 56 opposite the transmission crank arm 50 whereby the drive link is pivotably connected to the second arm 66. Another pin 84 is rigidly connected to the second arm 66 at the inner planar portion 74 thereof at a location on the second arm offset from a line between the pivot joints defined by the pins 72 and 80. The pin 84 has a cylindrical end defining a guide follower 86, FIG. 4, projecting below the inner planar portion 74 toward the motor 45.

As seen best in FIGS. 3 and 4, the variable throw crank arm assembly 58 further includes a guide 88 rigidly attached to the motor housing 47 between the latter and the second arm 66. The guide 88 has formed therein a guide channel 90 opening toward the second arm 66 and including a circular portion 92 and an escape portion 94 radially outboard of the circular portion relative to the axis 49 merging with the circular portion at a junction 96, FIG. 3. The guide follower 86 of the pin 84 is slidably received in the guide channel 90 and functions as described hereinafter to automatically control the position of the second arm 66 relative to the first arm 60.

In operation, the drive shaft 48 of the motor 45 rotates clockwise, FIG. 3, when driving the wiper arms 36 and 38 through a normal wipe pattern and counterclockwise to park the wiper arms below the normal wipe pattern. More particularly, with the guide follower 86 received in the circular portion 92 of the guide channel, the second arm 66 assumes a folded, short-throw position, shown in solid lines in FIG. 3, relative to the first arm 60. When the drive shaft 48 rotates clockwise, the pin 72 on the first arm 60 orbits in a circle around the axis 49. The guide follower 86 is constrained by the sides of the circular portion 92 of the guide channel to move in a circle around the axis 49 so that the second arm 66 and the first arm 60 rotate as a unit around the axis 49 with the spherical end 82 of the pin 80 orbiting in a circle around the same axis at a short-throw radius designated $r_1$. Since the spherical end 82 is connected to the end of drive link 56, the latter reciprocates through an amplitude proportional to the radius $r_1$ thereby pivotally oscillating the transmission shafts 28 and 30 through the transmission crank arms 50 and 52, respectively, and causing the wiper arms 36 and 38 to traverse normal wiping patterns on the windshield panel 22 bounded by outer wipe limits 98 and 100 and inner wipe limits 102 and 104. As the drive shaft 48 rotates continuously in the clockwise direction, the resultant reaction force on the spherical end 82 reverses direction approximately every 180° of rotation of the first and second arms 60 and 66 about the axis 49 as the force transmitted by the drive link 56 alternates between tension and compression. In either case, however, because the guide follower 86 is offset from a line between the pins 72 and 80 in a direction opposite to the direction of rotation of the drive shaft, i.e. in the counterclockwise direction, the resultant reaction force between the circular portion 92 of the guide channel 90 and the follower 86 is always at the radially innermost surface of the circular portion 92. Accordingly, the guide follower 86 does not leave the circular portion 92 as it periodically crosses, unrestrained, the junction 96 between the circular portion 92 and the escape portion 94. The second arm 66 is thus retained in the folded position relative to the first arm 60 as the drive shaft 48 continuously rotates clockwise.

To terminate wiping operation and park the wiper arms 36 and 38, a control switch, not shown, is activated to reverse the direction of rotation of the drive shaft 48 of the motor. The first arm 60 is thus driven counterclockwise, FIG. 3, in a park direction. The guide follower 86 on the second arm 66 is likewise, initially, driven counterclockwise around the axis 49 in the circular portion 92 of the guide channel 90. Reversal of motor shaft rotation reverses the resultant reaction on the guide follower 86 to the radially outermost surface of the circular portion 92 of the guide channel so that at the junction 96 the guide follower 86 automatically enters the escape portion 94 of the guide channel 90. As the drive shaft 48 continues to rotate counterclockwise, the noncircular configuration of the escape portion 94 initiates concurrent pivotal movement of the second arm 66 relative to the first arm 60 from the folded position thereof to an unfolded position, shown in broken lines in FIG. 3, achieved when the guide follower 86 reaches the outermost end of the escape portion 94. At that instant, a switch, not shown, deenergizes the motor 45. The junction 96 is preferably located on the guide 88 such that during counterclockwise rotation of the drive shaft, the guide follower 86 enters the escape portion 94 when the wiper arms are at their outer wipe limits 98 and 100 so that partial wipe is avoided on the last full stroke of the arms.

As the second arm 66 unfolds relative to the first arm 60, the distance between the spherical end 82 of the pin 80 and the axis 49 increases from the radius $r_1$ to a larger long-throw radius $r_2$, FIG. 3, which is achieved when the second arm 66 achieves the unfolded position. As the spherical end 82 moves from the radius $r_1$ to the radius $r_2$ relative to axis 49, the amplitude of the stroke of drive link 56 increases beyond that corresponding to continuous rotation of the spherical end 82 at the radius $r_1$ so that the wiper arms 36 and 38 are pivoted beyond the inner wipe limits 102 and 104 of the normal wipe pattern to parked positions 106 and 108, respectively, below the corresponding wipe patterns. From the parked positions, normal wiping of the windshield 22 is initiated by clockwise rotation of the drive shaft 48. Guide follower 86 traverses the escape portion 94 of the guide channel from the remote end thereof to the junction 96 during which period the wiper arms are lifted from the parked positions 106 and 108 to the inner wipe limits 102 and 104. Continued clockwise rotation of the drive shaft causes the guide follower 86 to traverse the junction 96 into the circular portion 92, completing the refolding movement of the second arm 66 relative to the first arm 60 from the unfolded position back to the folded position. Continued clockwise rotation of the drive shaft, then, causes the wiper arms to oscillate between the inner and outer wipe limits 102, 104 and 98, 100.

The variable throw crank arm assembly 58 may be modified within the scope of this invention by location of the guide follower 86 on the second arm 66 at locations other than as shown in FIGS. 3 and 4. The limiting factors on the location of the guide follower are that the resultant reaction force thereon relative to the guide channel 90 occurs, in the area of the junction 96, at the radially innermost surface of the circular portion 92 of the latter when the drive shaft rotates clockwise and at the radially outermost surface when the drive shaft rotates counterclockwise.

The embodiments of the invention in which an exclusive property or privilege is claimed are defined as follows:

1. In a windshield wiper system on a vehicle body including a wiper arm pivotable on said body about a first axis, a drive link connected to said wiper arm and operative during reciprocation to pivot said wiper arm, and an electric motor having a drive shaft rotatable in opposite directions on a second axis of said body, a variable throw crank arm assembly comprising, a first arm rigidly attached to said drive shaft having a first pivot joint means thereon orbiting in a circle about said second axis during rotation of said drive shaft, a second arm having second pivot joint means thereon, means attaching said second arm to said first arm at said first pivot joint means for rotation with said first arm and for pivotal movement relative thereto between a short-throw folded position wherein said second pivot joint means is disposed at a first radius from said second axis and a long-throw unfolded position wherein said second pivot joint means is disposed at a larger second radius from said second axis, means connecting a distal end of said drive link to said second arm at said second pivot joint means, a guide follower on said second arm, and guide means on a housing portion of said motor defining a guide channel having a circular portion centered on said second axis and a noncircular escape portion radially outboard of said circular portion and merging therewith at a junction, said guide follower traversing said circular portion during continuous rotation of said drive shaft in one direction to maintain said second arm in said folded position so that said drive link reciprocates through a plurality of strokes having a first amplitude and automatically entering said escape portion through said junction in response to rotation of said drive shaft in the opposite direction to effect pivotal movement of said second arm to said unfolded position concurrently with rotation of said drive shaft in the opposite direction so that said drive link reciprocates through a final stroke having a second amplitude greater than said first amplitude.

2. The variable throw crank arm assembly recited in claim 1 wherein said guide follower is rigidly attached to said second arm at a location thereon offset from a line between said first and said second pivot joint means in a direction corresponding to said opposite direction of rotation of said drive shaft so that said guide follower always bears against a radially inner surface of said guide channel circular portion during rotation of dirve shaft in said one direction.

* * * * *